C. N. TYLER.
Lamp Wick.

No. 71,248. Patented Nov. 19, 1867.

Witnesses:

Inventor:
Charles N. Tyler

United States Patent Office.

CHARLES N. TYLER, OF BUFFALO, NEW YORK.

Letters Patent No. 71,248, dated November 19, 1867.

IMPROVEMENT IN LAMPS.

*The Schedule referred to in these Letters Patent and making part of the same.*

TO ALL WHOM IT MAY CONCERN:

Be it known that I, CHARLES N. TYLER, of Buffalo, in the county of Erie, and in the State of New York, have invented certain new and useful Improvements in Lamps; and I do hereby declare that the following is a full, clear, and exact description thereof, reference being had to the accompanying drawings, forming a part of this specification. In the drawings—

Figure 3:
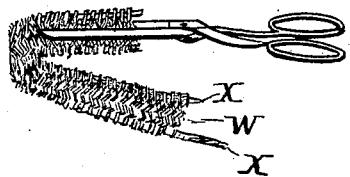
Figures 3 and 4 are perspective views, showing the mode of trimming the wick.
Figure 6:

This invention is in the nature of an improvement upon my patent for lamps granted on the twenty-seventh day of March, 1866, and consists in the improved construction of the "combination-wick" and "wick-tube," more fully hereinafter described.

In the drawing, T represents the top of an ordinary kerosene-oil lamp. The wick-tube A is secured to this in the common mode. This tube I prefer to have somewhat flattened, though it may be used round. The upper edge of the tube is a little flared out at its longest diameter, at $a$, and has a small groove, $e$, cut in each edge, as is fully shown in the enlarged view marked V. Not opposite each other, and at the shortest diameter, and about an eighth of an inch below the top of the tube, are two small air-openings $o$ $o$, for the admission of air to the base of the flame. The improved "wick" shown in the drawings is a "combination-wick," constructed with a large supply-wick and two small combustion-wicks, upon the principle set forth in my before referred to patent.

In making my improved wick as represented in the drawings, I first take a "supply-wick," W, consisting of a considerable bundle of soft cotton fibres, very loosely twisted. I then take two small "combustion-wicks" X, consisting each of a small bundle of soft cotton fibres, also loosely twisted, but spirally wrapped with a fine thread. The two combustion-wicks are then placed, one on each side of the supply-wick, and the three are braided together with a covering by suitable machinery, the finished wick appearing like that shown in the magnified view Z. This is the best mode known to me of making the threefold combination-wick, but it is easy to make them in other modes not substantially different. When a larger burner is to be used, I may take a larger supply-wick, and, in addition to the two combustion-wicks, may add a third in the centre of the supply-wick, and braid the four together in like manner with the three above described; and so with any other desired number.

Figure 4:
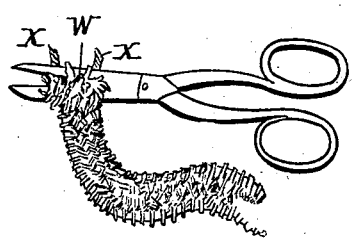
Figure 5:
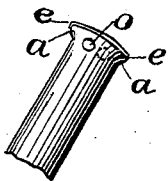
Figure 2:
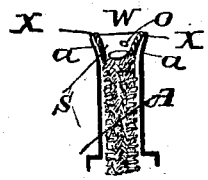
Figure 2 is a vertical section through the same.
Figure 1:
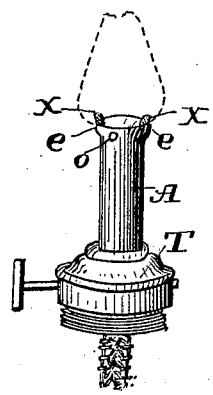
Figure 1 represents a perspective view of my improved wick-tube and wick.

In operating my invention, the wick has first to be trimmed as follows: When the wick is new, make a cut of about half an inch down the centre, as shown in fig. 3, for the purpose of exposing the combustion-wicks; after which cut away about one-quarter of an inch, as shown in fig. 4, being careful not to injure the combustion-wicks. Keep the combustion-wicks wound with their wrapping-thread so as to have a small and uniform surface to burn from. When ready to light, the supply-wick should come enough below the bottom of the holes $o$ $o$ to permit the regulation of the flame without closing them, as shown in fig. 2.

To trim the wick after having been burned, I cut off the ends of the combustion-wicks, and then cut off an equal length from the supply-wick, never permitting the supply-wick to rise high enough to close the openings $o$.

It will be noticed that the openings are made not opposite each other, so as to avoid a direct draught through them. When the lamp is moved suddenly, air passes into these holes sufficient to sustain the flame during the movement of the lamp. In wide burners there will be several openings on each side. My improved wick may be used, but not so advantageously, in a wick-tube without the openings $o$.

The wick W and combustion-wicks X may be arranged side by side in a flattened or other burner without being braided together, but this will be inconvenient, and will be done only when the manufactured combination-wick cannot be procured.

I am aware that certain patents for improvements in wicks and in lamps have been granted to C. F. Martine, and also to J. J. Marcy, and do not claim any device described in their patents.

It will be noticed that in this invention I dispense with the use of any supplemental jacket, such as was described in my patent before referred to.

My improved combination-wick is peculiarly adapted to signal-lights, because it is capable of sustaining a good light for a very long time without being trimmed—from twenty to thirty hours.

Having fully described my invention, what I claim as new, and desire to secure by Letters-Patent, is—

1. The combination-wick W X, consisting of a supply-wick combined with two or more combustion-wicks by means of a braided or other covering, substantially as and for the purposes set forth.

2. The wick-tube A, when flared and grooved, and provided with openings $o$, substantially as and for the purposes set forth.

3. The combination of the wick W X and the wick-tube A, substantially as and for the purposes set forth.

4. Arranging the combination-wick so as to leave a space, $s$, between the top of the supply-wick and the top of the burner, substantially as described.

In testimony that I claim the above-described invention, I have hereunto signed my name this 29th day of October, 1867.

C. N. TYLER.

Witnesses:
F. G. CLAYTON,
V. C. CLAYTON.